United States Patent Office 3,017,293
Patented Jan. 16, 1962

3,017,293
COATED CURED SYNTHETIC RUBBER SUBSTRATE
Leon Kutik, Jackson Heights, N.Y., assignor to Interchemical Corporation, New York, N.Y., a corporation of Ohio
No Drawing. Filed Apr. 28, 1959, Ser. No. 809,349
3 Claims. (Cl. 117—138.8)

This invention relates to a coated cured rubber material. More particularly it relates to a cured synthetic rubber material coated with a baked coating comprising an aqueous solution of an acrylic latex and a trialkylene phosphoramide.

Since cured synthetic rubber is usually black and does not have a homogeneous color there has been a need in many industries for a coated rubber material consisting of cured synthetic rubber substrate coated with a coating capable of having incorporated therein a variety of pigments. This invention provides such a coated rubber material.

The coated rubber material of this invention has been found to be particularly useful in the production of cove base rubber molding materials. Cove base rubber is a blend of S.B.R. and reclaim rubber which is used extensively as molding for linoleum and tile floor coverings. Because cove base rubber is black and non-homogeneous in color, it has been customary to apply a pigmented coating to the rubber which matches the colors of the floor coverings, thereby providing a desirable cove base molding. In addition, desirable cove base molding materials must have a coating which is flexible, rapid drying under relatively moderate heating and displays excellent adhesion and block resistance. The requirement of excellent block resistance is due to the manner in which coated cove base molding materials are normally packaged. They are normally packaged face to face within 15 to 30 minutes after their coatings are baked in packages having a gross weight of between 40 to 60 lbs. Because of this packaging, cove base rubber molding coatings must be able to withstand a pressure of 5 pounds per square inch at 140° F. for 20 hours.

In the past, cove base rubber molding has been coated with a nitrocellulose pigmented lacquer coating. Such coated cove base rubber has been found to be less than desirable because the coating frequently lacks the flexibility as well as the toughness or block resistance required of cove base rubber molding. In addition, such lacquer coatings employed organic solvents which would often cause spewing of the base rubber when the lacquer film was applied thereto. That is the organic solvent would extract organic soluble materials such as oils and waxes used in the rubber as fillers. Such extracted material would act to produce undesirable discoloration of the pigmented lacquer coating. Further, nitrocellulose lacquer is low in application solids and may often require a second application in order to provide complete opacity.

By employing the new rubber material of this invention, there has been produced a cove base rubber molding coated with a new coating, more fully defined below, which has excellent adhesion, flexibility and block resistance when applied to cove base rubber. In addition, since the coating is in an aqueous vehicle, the above described spewing of the base rubber and consequent discoloration of the cured coating is substantially reduced. This new coating also is sufficiently high in application solids so that one application gives complete opacity.

This invention, therefore, provides a coated rubber material comprising a base of S.B.R. (butadiene-styrene rubber) one surface of which carries a coating formed by curing a film which is an aqueous solution of a major portion, based upon solids content, of an acrylic latex comprising the addition polymerization product of ethyl acrylate, methyl methacrylate and methacrylic acid and a minor portion, exceeding 5% by weight on a solids basis, of trialkylene phosphoramide which has the following structure.

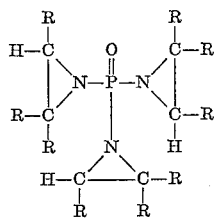

wherein R is a member of the group consisting of hydrogen, methyl and ethyl.

There are no critical limitations with respect to the proportions of acrylic latex and trialkylene phosphoramide used other than that the minimum quantity of trialkylene phosphoramide used must exceed 5% by weight on a solids basis. Because of the relative costs of the reactants, it is preferred to employ as small a quantity of trialkylene phosphoramide as possible. In the preferred embodiment of this invention approximately 8% of trialkylene phosphoramide by weight on a solids basis is used. In any case, the acrylic latex should comprise a major portion of the solids content.

With respect to the acrylic latex, the proportions of the components therein, while not critical, should be chosen to provide a desirable acrylic latex. The following proportions have been found to be most preferable for the practice of this invention. Methacrylic acid 3 to 10%, methyl methacrylate 23 to 28%, and ethyl acrylate 62 to 74% by weight. It should be noted that the composition of the acrylic latex need not be limited to the preferred components. The ethyl acrylate and/or the methyl methacrylate may be replaced by an ester or mixture of esters having physical properties similar to the replaced esters selected from the alkyl esters of acrylic and methacrylic acid in which the alkyl groups contain from one to eight carbon atoms. Also itaconic acid may be used instead of methacrylic acid.

It should be noted that the use of new coated cured rubber material of this invention is not limited to cove base rubber molding material. It will be obvious to those skilled in the art that the material may be employed in the production of a variety of products which include colored rubber hoses, rubber mats, and toys.

The examples which follow indicate the preferred embodiments of the invention.

*Example 1—Preparation of acrylic latex*

900 g. of ethyl acrylate, 252 g. of methyl methacrylate, 48 g. of methacrylic acid and 24 g. of Dupanol C (an emulsifying agent produced by the Du Pont Corp.) are added to 1780 g. of water and mixture is emulsified.

To ¼ of the resulting emulsion and 5.5 g. of 10% ammonium persulfate solution catalyst refluxing at 80° C., there is added the remaining ¾ of the emulsion dropwise over a period of 2 hours during which time the temperature is slowly raised to 100° C. During this 2 hour period of refluxing, 3 further additions of 5 g. of 10% ammonium persulfate catalyst are made at regular intervals. The mixture is then cooled and the polymeric product is separated from the water by filtration. The resulting product has a 38.8% solids content by weight which indicates a 97.2% conversion of monomers to copolymer.

*Example 2—Coated cove base rubber*

6.4 parts of 50% water solution of tripropylene phosphoramide are added to 4.2 parts of Aquablack M pigment (a 50% dispersion of carbon black in water manufactured by Columbia Carbon Corp.) while stirring the mixture. Then 100 parts of the product of Example 1 are added to the mixture. A thin film of resulting mixture is applied to a cove base rubber substrate, preferably by spraying. The film is then baked at 200° F. for 15 minutes. The resulting coating is well cured, exhibits flexibility as well as superior block resistance. It can withstand a pressure of 5 pounds per square inch at 140° F. for 20 hours.

While the pigment described in the preceding example was Aquablack M, it should be noted that any of the commercially available water dispersed pigments may be used in the aqueous system of this invention.

*Example 3—White cove base rubber*

75 parts by weight of a 1.44% solution of NH₃ are added to 265 parts of the product of Example 1. 6.4 parts of a 50% aqueous solution of tripropylene phosphoramide are then added. A pigment is prepared by grinding the following materials together in a ball mill for 18 hours:

| | Parts by weight |
|---|---|
| Rutile titanium dioxide | 46.7 |
| 10% solution of Acrysol A-3 (polyacrylic acid produced by Rohm & Haas Inc.) | 0.9 |
| Water | 52.4 |

76 parts of the resulting pigment is then added to the above described mixture. A thin film of the resulting mixture is applied to a cove base rubber substrate, preferably by spraying. The film is then baked at 200° F. for 15 minutes. The resulting coating is well cured, exhibits flexibility as well as superior block resistance. It can withstand a pressure of 5 pounds per square inch at 140° F. for 20 hours.

While there have been described what are considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An article of manufacture comprised of a cured synthetic rubber substrate having one surface coated with a cured film comprised of the addition polymerization product of ethyl acrylate, methyl methacrylate and methacrylic acid and a minor portion of trialkylene phosphoramide having the structure:

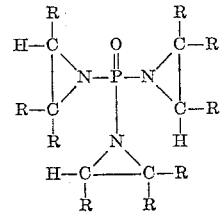

where R is a member of the group consisting of hydrogen, methyl and ethyl, said trialkylene phosphoramide exceeding 5% by weight of the cured film.

2. An article of manufacture as defined in claim 1 wherein the cured film is pigmented.

3. An article of manufacture as defined in claim 1 wherein the addition polymerization product consists of 3 to 10 parts by weight of methacrylic acid, 23 to 28 parts by weight of methyl methacrylate and 62 to 74 parts by weight of ethyl acrylate and the trialkylene phosphoramide is tripropylene phosphoramide.

References Cited in the file of this patent

UNITED STATES PATENTS

| | | |
|---|---|---|
| 2,606,902 | Parker et al. | Aug. 12, 1952 |
| 2,754,280 | Brown et al. | July 10, 1956 |
| 2,760,542 | Peterson et al. | Aug. 28, 1956 |
| 2,949,386 | Cassel | Aug. 16, 1960 |